(12) United States Patent
Cooper

(10) Patent No.: US 6,647,733 B2
(45) Date of Patent: Nov. 18, 2003

(54) DRY AIR INJECTION SYSTEM

(76) Inventor: Thomas L. Cooper, 13909 Sparta Ave., Kent City, MI (US) 49330

( * ) Notice: Subject to any disclaimer, the term of this patent is extended or adjusted under 35 U.S.C. 154(b) by 0 days.

(21) Appl. No.: 10/227,762

(22) Filed: Aug. 26, 2002

(65) Prior Publication Data

US 2003/0079481 A1 May 1, 2003

Related U.S. Application Data

(63) Continuation-in-part of application No. 10/035,632, filed on Oct. 26, 2001.

(51) Int. Cl.[7] ............... F17C 13/00; F25D 21/00; F16L 11/00
(52) U.S. Cl. ............... 62/50.7; 62/272; 138/114
(58) Field of Search .............. 62/50.7, 272; 138/114

(56) References Cited

U.S. PATENT DOCUMENTS

| | | |
|---|---|---|
| 2,572,062 A | 10/1951 | Sexton |
| 2,592,574 A | 4/1952 | Kaiser |
| 2,610,028 A | 9/1952 | Smith |
| 3,151,633 A | 10/1964 | Shuman |
| 3,213,889 A | 10/1965 | Cotman, Jr. |
| 3,254,012 A | 5/1966 | Ziegler |
| 3,319,431 A | 5/1967 | Clarke et al. |
| 3,388,724 A | 6/1968 | Mowell et al. |
| 3,410,313 A | 11/1968 | Martin |
| 3,461,918 A | 8/1969 | Gerner |
| 3,490,344 A | 1/1970 | Archer et al. |
| 3,511,282 A | 5/1970 | Willhite et al. |
| 3,547,161 A | 12/1970 | Reece et al. |
| 3,627,164 A * | 12/1971 | Wilson .................. 220/592.01 |
| 3,706,208 A * | 12/1972 | Kadi et al. ................ 62/50.7 |
| 3,717,718 A | 2/1973 | Schmidtchen |
| 3,777,502 A | 12/1973 | Michie, III et al. |
| 3,796,977 A | 3/1974 | Elliot et al. |
| 3,830,067 A | 8/1974 | Osborn et al. |
| 3,831,636 A | 8/1974 | Bittner |
| 3,866,670 A | 2/1975 | Cramer et al. |
| 3,904,394 A | 9/1975 | Prast et al. |
| 3,939,875 A | 2/1976 | Osborn et al. |
| 4,014,369 A | 3/1977 | Kobres, Jr. |
| 4,130,140 A | 12/1978 | Cerny et al. |
| 4,139,024 A | 2/1979 | Adorjan |
| 4,194,536 A | 3/1980 | Stine et al. |
| 4,279,270 A | 7/1981 | Francis, Jr. |
| 4,303,105 A | 12/1981 | Rohner |
| 4,715,187 A | 12/1987 | Stearns |
| H594 H | 3/1989 | Adorjan |
| 4,878,354 A | 11/1989 | Stearns et al. |
| 4,924,679 A | 5/1990 | Brigham et al. |
| 5,160,769 A | 11/1992 | Garrett |
| 5,291,741 A | 3/1994 | Grimes |
| 5,307,639 A | 5/1994 | Boissin |
| 5,400,602 A | 3/1995 | Chang et al. |
| 5,425,723 A * | 6/1995 | Wang .................... 604/523 |
| 5,722,802 A * | 3/1998 | March ..................... 406/46 |
| 5,827,370 A * | 10/1998 | Gu ....................... 118/715 |
| 6,070,413 A * | 6/2000 | Ward ..................... 62/50.7 |
| 6,474,078 B2 * | 11/2002 | Chalk et al. ............... 62/50.5 |

FOREIGN PATENT DOCUMENTS

| | | |
|---|---|---|
| DE | 4135430 | 4/1993 |
| GB | 2040011 | 8/1980 |

OTHER PUBLICATIONS

Fish Farming International, "Low–cost aerators boost Hawaii pond capacity," Oct. 1985, 1 page.

* cited by examiner

Primary Examiner—William C. Doerrler
(74) Attorney, Agent, or Firm—Price, Heneveld, Cooper, DeWitt & Litton

(57) ABSTRACT

A fluid transport system including a fluid transfer assembly, a supply of dry gas and a tube. The fluid transfer assembly includes a pipe for transporting a cold fluid and a vapor barrier surrounding the pipe. The tube is connected to the the supply of dry gas and the fluid transfer assembly, and located at least partially within the fluid transfer assembly. The tube transfers gas from the supply of dry gas to the fluid transfer assembly throughout at least a segment of the tube within the fluid transfer assembly.

38 Claims, 3 Drawing Sheets

DRY AIR INJECTION SYSTEM

CROSS-REFERENCE TO RELATED APPLICATION

The present application is a continuation-in-part of U.S. application Ser. No. 10/035,632 filed on Oct. 26, 2001, entitled DRY AIR INJECTION SYSTEM, the entire contents of which are hereby incorporated herein by reference.

BACKGROUND OF THE INVENTION

The present invention relates to a cooling system for commercial freezers.

Cooling systems include a refrigeration system for cooling the temperature of a fluid and a pipe for transporting the fluid to an evaporator wherein the cold temperature of the fluid is transferred to the air surrounding the evaporator to cool the air surrounding the evaporator.

Heretofore, the coolant pipe coming from the refrigeration system has included insulation surrounding the pipe for maintaining the low temperature of the fluid within the pipe and for improving the efficiency of the cooling system. Furthermore, the insulation has included a vapor barrier surrounding the pipe and the insulation for keeping moisture in the air away from the pipe to prevent condensation of water on the outside surface of the pipe. When water condenses on the pipe, the pipe can experience varying growth and shrinking phases that can jeopardize the structural integrity of the pipe. If the pipe goes through too many phases, the pipe can leak, thereby greatly reducing the efficiency of the cooling system. Therefore, the pipe usually has to be replaced before the pipe begins to leak. Replacing the pipe, however, can be very expensive and will effectively shut down the freezer while the pipe is being replaced.

However, maintaining the integrity of the insulation and the vapor barrier is very difficult. Thousands of growth and shrinkage cycles due to temperature changes make maintaining vapor barrier integrity next to impossible. It is generally known that insulation in low temperature installations have a life of ten to fifteen years, with failures occurring within the first couple of years due to small failures in the vapor barrier.

Accordingly, an apparatus solving the aforementioned disadvantages is desired.

SUMMARY OF THE INVENTION

In the cooling apparatus and method of the present invention, dry gas is injected into the space between the vapor barrier and the coolant pipe throughout a length of the space to evaporate liquid that has condescended on either the vapor barrier or the coolant pipe, thereby prolonging the life of the cooling apparatus.

The fluid transport system and the refrigeration system are efficient in use, economical to manufacture, capable of a long operable life, and particularly adapted for the proposed use.

These and other features, advantages, and objects of the present invention will be further understood and appreciated by those skilled in the art by reference to the following specification, claims and appended drawings.

DETAILED DESCRIPTION OF THE PREFERRED EMBODIMENTS

Figure 1:
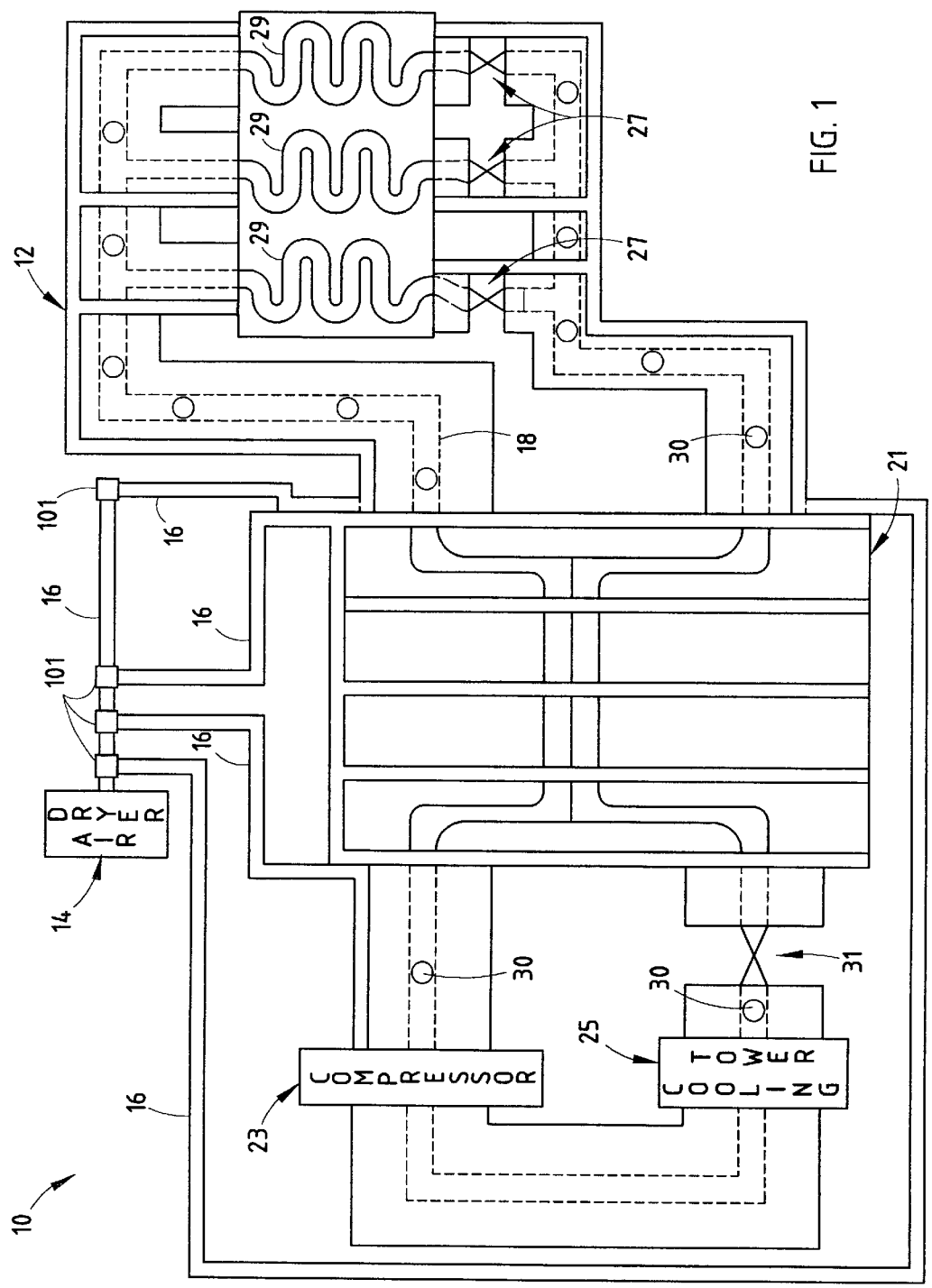
FIG. 1 is a schematic of a cooling system embodying the present invention.

For purposes of description herein, the terms "upper," "lower," "right," "left," "rear," "front," "vertical," "horizontal," and derivatives thereof shall relate to the invention as orientated in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The reference number 10 (FIG. 1) generally designates a fluid transport system of the present invention. In the illustrated example, the fluid transport system 10 includes a fluid transfer assembly 12, an air dryer 14 and a tube 16. The fluid transfer assembly 12 includes a pipe 18 for transporting a cold fluid and a vapor barrier 20 surrounding the pipe 18. The air dryer 14 removes moisture in the air. The tube 16 is connected to the air dryer 14 and the fluid transfer assembly 12, and is located at least partially within the fluid transfer assembly 12. The tube 16 transfers air from the air dryer 14 to the fluid transfer assembly 12 throughout at least a segment of the tube 16 within the fluid transfer assembly 12.

In the illustrated example, the fluid transport system 10 is included in a cooling system 22 (FIG. 1). The cooling system 22 comprises a refrigeration cycle having a chiller 21, a compressor 23, a cooling tower or condenser 25, a plurality of expansion valves 27 and a plurality of evaporators 29. The cooling system 22 reduces the temperature of a commercial freezer 26 having the evaporators 29 therein. The cooling system 22 is preferably used to keep food in a supermarket cold. Therefore, the cooling system 22 can be used in a supermarket wherein shoppers or the staff of the supermarket can get cold food out of the commercial freezer 26. It is also contemplated that the cooling system 22 could be used to lower the temperature of any space wherein a cold air temperature is desired. The fluid flowing through the refrigeration system 24 and the fluid transfer assembly 12 can be any gas or liquid that has a temperature lower than the ambient temperature. The chiller 21 as described in this application can include any of the commercially available chillers sold by YORK International Corporation of York, Pa. The compressor 23, the cooling tower 25, the expansion valves 27 and the evaporators 29 are well known to those the skilled in the art. Those skilled in the art will appreciate that other similarly functioning refrigeration systems may be used.

In the illustrated cooling system 22, the cold fluid in the cooling system 22 flows to the commercial freezer 26 through the fluid transfer assembly 12 to lower the temperature in the commercial freezer 26, thereby keeping the food in the commercial freezer 26 cold. Initially, the fluid enters the compressor 23 and is compressed, typically into a gaseous state, by the compressor 23. The fluid thereafter leaves the compressor 23 in a heated state. The fluid will then enter the cooling tower 25, wherein the temperature of the fluid is lowered. Once the fluid leaves the cooling tower 25, the fluid can pass by a pressure relief valve 31 before entering the chiller 21. The chiller 21 is, among other things, a heat exchanger. The chiller 21 lowers the temperature of the fluid from the cooling tower 25 by transferring heat from the fluid coming from the cooling tower 25 to a colder fluid entering the compressor 23. The fluid then continues to the expansion valves 27, wherein the temperature of the fluid is reduced before the fluid enters the evaporators 29 within the commercial freezer 26. Once the fluid leaves the evaporators 29, the fluid travels through the chiller 21 once again to absorb some of the heat of the fluid in the line between the cooling tower 25 and the expansion valves 27, as discussed above. The fluid then enters the compressor 23 to start the cooling process over again.

Figure 2:
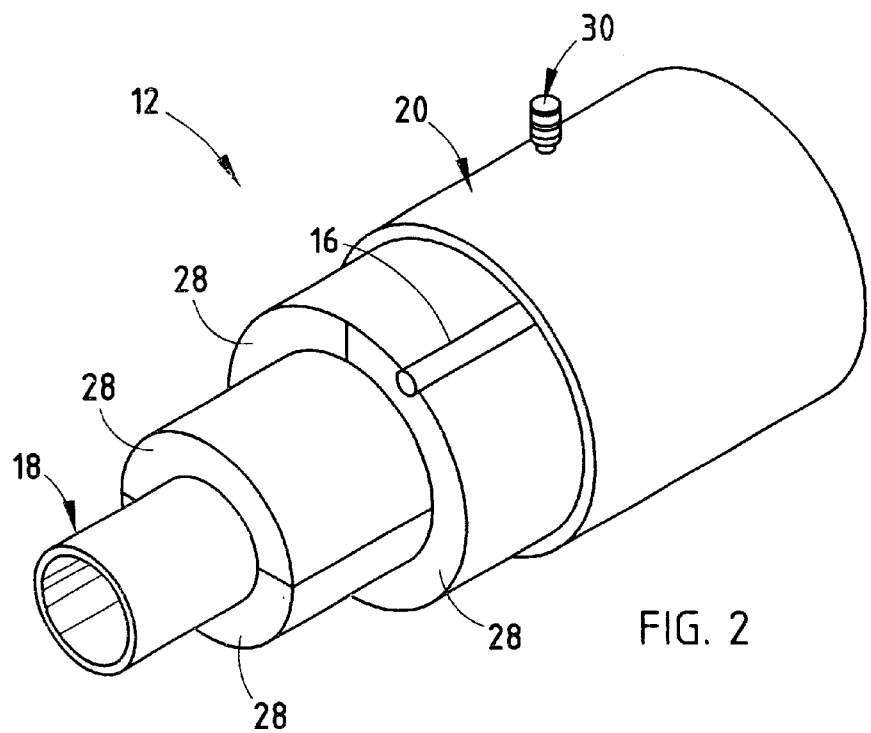
FIG. 2 is a perspective cut-away view of a fluid transfer assembly of the present invention.
Figure 3:
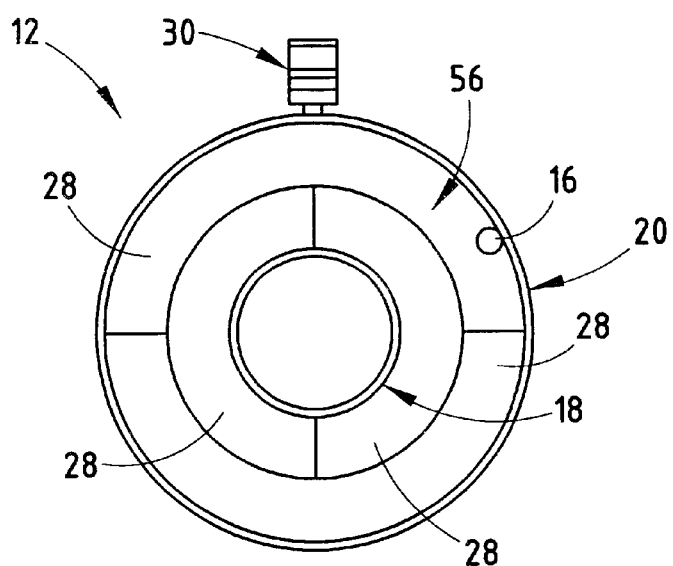
FIG. 3 is a cross-section view of the fluid transfer assembly of the present invention.

The illustrated fluid transfer assembly 12 (FIGS. 2–3) includes the pipe 18 for transporting the cold fluid, with insulation 28 surrounding the pipe 18 and the vapor barrier 20 surrounding the pipe 18 and the insulation 28. The pipe 18 is preferably cylindrical and made of carbon steel or stainless steel. Furthermore, the insulation is preferably made of any commercially available insulation (e.g., STYROFOAM). The vapor barrier 20 is also cylindrical and is commercially available from MFM Building Products Corporation located in Coshocton, Ohio, under the commercial name Flex Clad/I30. In a preferred embodiment, the tube 16 is located adjacent the interior surface of the vapor barrier 20 and the insulation 28 fills the remaining space 56 between the pipe 18 and the vapor barrier 20.

In the illustrated example, the tube 16 is connected to the air dryer 14 and extends though areas of the fluid transfer assembly 12 having cold fluid within the pipe 18. The tube 16 preferably splits into four parts and enters the fluid transfer assembly 12 located between the chiller 21 and the compressor 23, between the chiller 21 and the evaporators 29, between the evaporators 29 and the chiller 21 and within the chiller 21. Preferably, a flow meter 101 is located at each of the splits in the tube 16 to ensure that the flow in each of the four parts of the tube 16 is equal. The air dryer 14 includes a system for removing moisture in the air and for lowering the dew point of the air. The air dryer 14 as described in this application is commercially available from Hankison located in Canonsburg, Pa., under the commercial name DHW-25. Those skilled in the art will appreciate that other similarly functioning air dryers may be used. It is contemplated that the air used can be a single elemental gas (e.g., one of the noble gases, nitrogen, etc.). For example, the single elemental gas can be used when the fluid in the fluid transfer assembly 12 is kept at an extremely low temperature.

The illustrated tube 16 is preferably cylindrical and made of nylon for the portion of the tube 16 not located within the fluid transfer assembly 12. However, the portion of the tube 16 located within the fluid transfer assembly 12 preferably injects dry air into the space 56 throughout the length of the space 56. Therefore, a segment of the tube 16 within the fluid transfer assembly 12 transfers air from the air dryer 14 to the fluid transfer assembly 12 throughout at least the segment of the tube 16 within the fluid transfer assembly 12. The tube 16 within the fluid transfer assembly 12 is micro-porous tubing allowing the dry air to seep into the space 56 at a uniform rate along the length of the micro-porous tubing and over any portion of the surface area of the micro-porous tubing. Preferably, the micro-porous tubing is a lightweight fibrous plastic tubing sold under the commercial name "Oxyflo," which is commercially available from International Aeration Systems, Inc. located in St. Catharines, Ontario, Canada, and disclosed in U.S. Pat. Nos. 3,939,875 and 3,830,067, the entire contents of which are hereby incorporated herein by reference. The dry air entering the tube 16 from the air dryer 14 is injected though the micro-porous openings and into the space 56 between the vapor barrier 20 and the pipe 18 for removing the moisture in the space 56 between the vapor barrier 20 and the pipe 18.

In operation of the fluid transfer assembly 10, the dry air entering the space 56 between the pipe 18 and the vapor barrier 20 from the tube 16 will absorb any water on the pipe 18 or the vapor barrier 20 produced through condensation. Water on the pipe 18 and vapor barrier 20 as a result of condensation will cause the pipe 18 and/or the vapor barrier 20 to shrink, thereby reducing the lifetime of the pipe 18 and the vapor barrier 20. With the dry air entering the fluid transfer assembly 12, the pipe 18 and the vapor barrier 20 can have an expected lifetime of 5 to 10 times longer than a pipe 18 and vapor barrier 20 without any injection of dry air. Furthermore, with the dry air entering the space 56 along the fluid transfer assembly 12, the entire length of the pipe 18 and the vapor barrier 20 will have any water on the pipe 18 and vapor barrier 20 evaporated therefrom, as discussed above, to extend the life of the entire length of the pipe 18 and the vapor barrier 20. If the dry air only entered at the ends of the fluid transfer assembly 12, only the life of the ends of the pipe 18 and the vapor barrier 20 would be extended. Consequently, the pipe 18 and the vapor barrier 20 will not have to be replaced as frequently as a pipe and vapor barrier without dry air injected into the space 56 between the pipe and vapor barrier.

Figure 4:
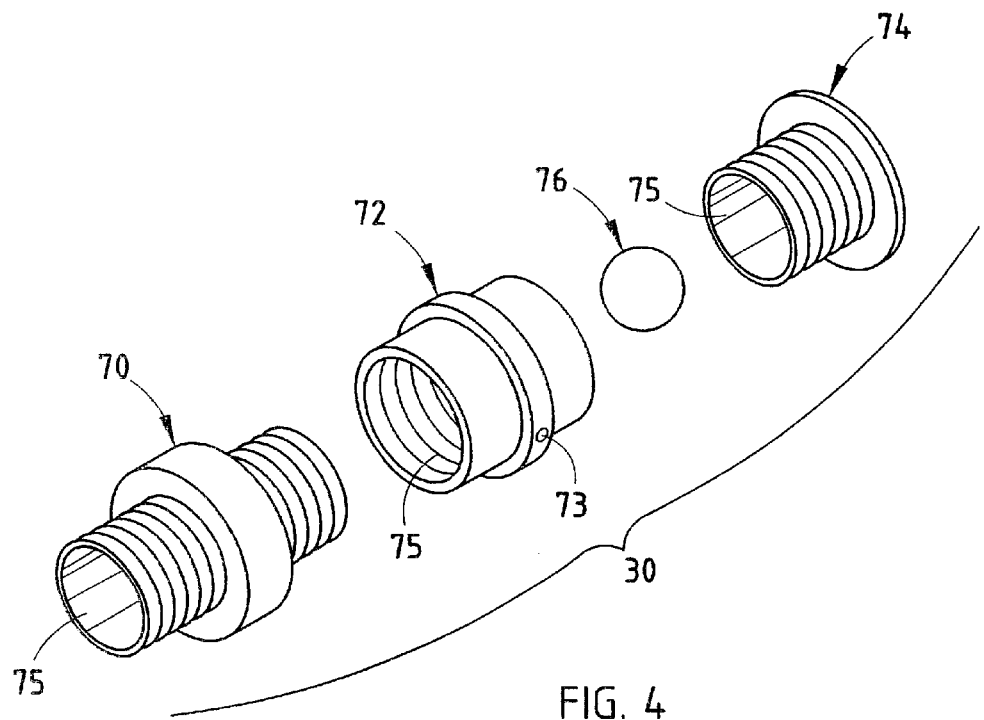
FIG. 4 is an exploded view of a check valve of the present invention.

In the preferred embodiment, the fluid transport system 10 also includes a plurality of check valves 30 (FIG. 4) located along the length of the fluid transfer assembly 12. The check valves 30 are connected to the vapor barrier 20 and allow air to escape the space 56 between the pipe 18 and the vapor barrier 20. Preferably, the check valves 30 are located equidistant apart from each other. Each check valve 30 preferably includes a nylon reducing nipple 70 inserted into the vapor barrier 18, a nylon coupling 72 connected to the nipple 70, a nylon plug 74 connected to the nylon coupling 72 and a nylon ball 76 located between the nylon coupling 72 and the nylon plug 74. The nipple 70, coupling 72 and plug 74 each have an aligned aperture 75 to create a fluid path through the check valve 30. The ball 76 is located in a semi-spherical bowl (not shown) in the upper portion of the coupling 72. The aligned apertures of the nipple 70, coupling 72 and plug 74 are vertically arranged such that gravity forces the ball 76 downward to close off the fluid path in the check valve 30. When the pressure of the air in the space 56 between the pipe 18 and the vapor barrier 20 rises above a certain level, the ball 76 will lift to allow the air in the space between the pipe 18 and the vapor barrier 20 to escape through an aperture 73 in the nylon coupling 72. The check valve 30 as described directly above is known to those skilled in the art. Additionally, those skilled in the art will appreciate that other similarly functioning check valves can be used.

In operation, the check valves 30 preferably allow the air in the space 56 between the pipe 18 and the vapor barrier 20 to remain at atmospheric pressure. Therefore, as the dry air is injected into the space 56 between the pipe 18 and the vapor barrier 20, an equal amount of air will escape the space 56 between the pipe 18 and the vapor barrier 20 though the check valves 30 and into the atmosphere. Consequently, the air in the space 56 between the pipe 18 and the vapor barrier 20 will have a lower dew point than the atmospheric air. Accordingly, the dry air injected into the space 56 between the pipe 18 and the vapor barrier 20 will continuously remove any moisture in the space 56 between the pipe 18 and the vapor barrier 20, thereby improving the life span of the pipe 18 and the vapor barrier 20. Preferably, all of the check valves 30 have the plug 74 and the ball 76 removed and a flow meter is inserted into the nylon coupling 72 to check the flow of the air out of the space 56 between the pipe 18 and the vapor barrier 20 to ensure that the air flow for each of the check valve 30 locations is substantially equal.

Figure 5:
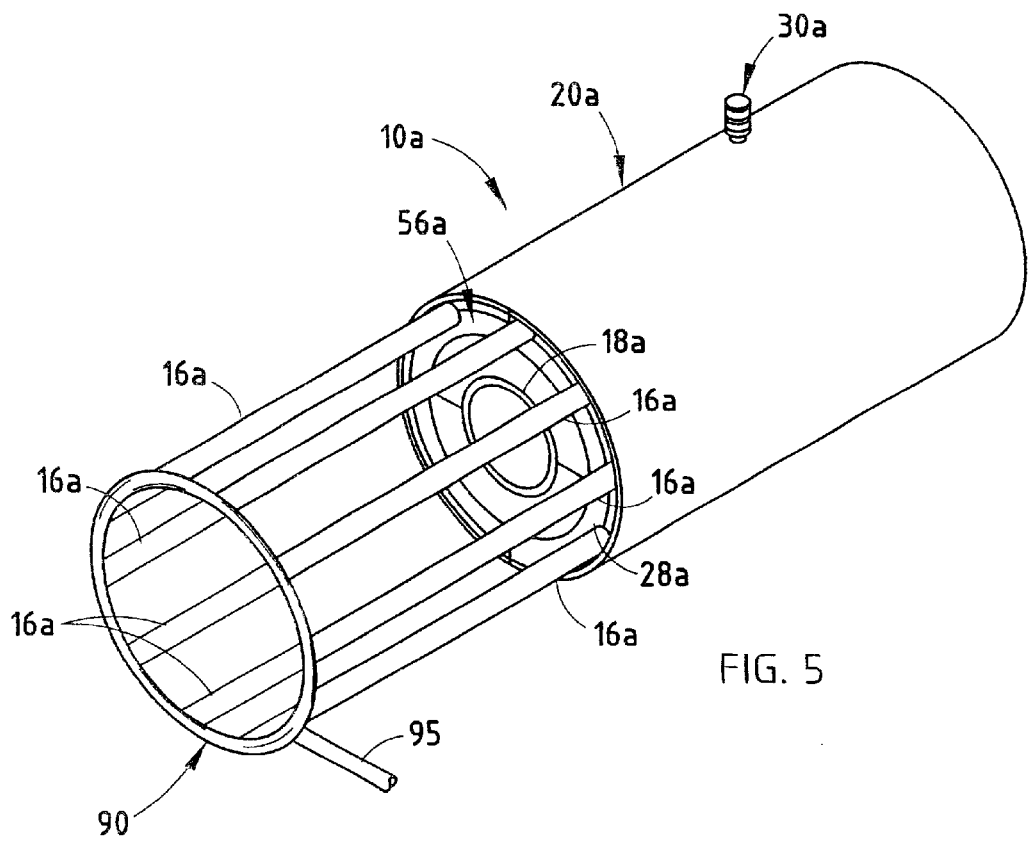
FIG. 5 is a perspective cut-away view of a fluid transfer assembly of a second embodiment of the present invention.

The reference numeral 10a (FIG. 5) generally designates a second preferred embodiment of the invention, having a second preferred embodiment of the fluid transport system. Since fluid transport system 10a is similar to the previously described fluid transport system 10, similar parts appearing in FIG. 2 and FIG. 5, respectively, are represented by the same, corresponding reference numeral, except for the suffix "a" in the numerals of the latter. The fluid transport system 10a includes a plurality of tubes 16a in the fluid transfer assembly 12a. The fluid transport system 10a includes an annular supply header 90 fluidly connected to each of the tubes 16a and the air dryer 14a. The supply header 90 is preferably located within the refrigeration system 22a adjacent the outlet port 50a. In operation, dry air coming from the air dryer 14a is forced through a connection tube 95 connecting the air dryer 14a and the supply header 90a. The supply header 90 thereafter separates the dry air into a plurality of flow paths, with each flow path located through each tube 16a. Consequently, the tubes 16a will each inject air into the space 56a between the pipe 18a and the vapor barrier 20a. The second embodiment of the fluid transport system 10a is preferably used with very large pipes 18 or in the insulation of a closed vessel (e.g., the chiller 21). The number of tubes 16 in the third embodiment of the fluid transport system 10a varies depending on the area of insulation and the length of the pipe 18.

In the forgoing description, it will be readily appreciated by those skilled in the art that modifications may be made to the invention without departing from the concepts disclosed herein. Such modifications are to be considered as included in the following claims, unless these claims by their language expressly state otherwise.

We claim:

1. A fluid transport system comprising:
   a fluid transfer assembly including a pipe for transporting a cold fluid and a vapor barrier surrounding the pipe;
   a supply of dry gas; and
   a tube connected to the supply of dry gas and the fluid transfer assembly, and located at least partially within the fluid transfer assembly;
   wherein the tube transfers dry gas from the supply of dry gas to the fluid transfer assembly throughout at least a segment of the tube within the fluid transfer assembly.

2. The fluid transport system of claim 1, wherein:
   the segment of the tube is located between the vapor barrier and the pipe; and
   the tube includes a plurality of micro-porous openings for transferring the dry gas from the supply of dry gas into an area between the vapor barrier and the pipe.

3. The fluid transport system of claim 2, wherein:
   at least a portion of the vapor barrier is spaced from the pipe; and
   insulation is located between the portion of the vapor barrier and the pipe.

4. The fluid transport system of claim 1, further including:
   at least one check valve connected to the vapor barrier of the fluid transfer assembly for allowing gas to escape from the vapor barrier.

5. The fluid transport system of claim 1, wherein:
   the segment of the tube includes a plurality of micro-porous openings for transferring the gas from the supply of dry gas into the fluid transfer assembly.

6. The fluid transport system of claim 5, wherein:
   the segment of the tube transfers gas into the fluid transfer assembly at a substantially equal rate along the segment of the tube.

7. The fluid transport system of claim 1, wherein:
   the supply of dry gas comprises an air dryer for removing moisture in air to provide dry air; and
   the dry gas is the dry air provided by the air dryer.

8. A method of insulating a fluid transfer assembly having a pipe for transporting a cold fluid and a vapor barrier surrounding the pipe, the method comprising:
   supplying dry gas; and
   connecting a tube to the supply of dry gas and the fluid transfer assembly; and
   injecting gas from the supply of dry gas into the fluid transfer assembly throughout at least a segment of the tube within the fluid transfer assembly.

9. The method of insulating a fluid transfer assembly of claim 8, further including:
   locating the segment of the tube between the vapor barrier and the pipe of the fluid transfer assembly;
   providing the segment of the tube with a plurality of micro-porous openings;
   wherein the step of injecting gas includes injecting gas through the plurality of micro-porous openings.

10. The method of insulating a fluid transfer assembly of claim 8, further including:
    spacing the vapor barrier from the pipe; and
    placing insulation between the vapor barrier and the pipe.

11. The method of insulating a fluid transfer assembly of claim 8, further including:
    providing the tube with a plurality of conduits comprising the segment of the tube; and
    connecting the plurality of conduits to an outside surface of the vapor barrier;
    wherein the step of injecting gas includes injecting gas from the supply of dry gas and into the fluid transfer assembly through the conduits.

12. The method of insulating a fluid transfer assembly of claim 11, further including:
    spacing at least a portion of the vapor barrier from the pipe; and
    placing insulation between the portion of the vapor barrier and the pipe.

13. The method of insulating a fluid transfer assembly of claim 8, further including:
    connecting at least one check valve to the vapor barrier of the fluid transfer assembly; and
    removing gas from the fluid transfer assembly through the check valve, whereby the gas in the fluid transfer assembly can maintain a low dew point.

14. The method of insulating a fluid transfer assembly of claim 13, further including:
    the step of connecting at least one check valve to the vapor barrier includes connecting a plurality of check valves to the vapor barrier.

15. The method of insulating a fluid transfer assembly of claim 8, further including:
wherein the step of injecting gas includes injecting gas through the plurality of micro-porous openings at a substantially equal rate along the segment of the tube.

16. The method of insulating a fluid transfer assembly of claim 8, wherein:
the step of supplying dry gas includes removing moisture from air with an air dryer.

17. A cooling system comprising:
a fluid transfer assembly including a pipe for transporting a cold fluid, insulation surrounding the pipe and a vapor barrier surrounding the insulation and the pipe;
a supply of dry gas to thereby create gas with a dew point lower than the dew point of moist air located within the fluid transfer assembly;
a tube connected to the supply of dry gas and the fluid transfer assembly, and at least partially located within the fluid transfer assembly; and
a plurality of check valves connected to the vapor barrier;
wherein the gas with the dew point lower than the dew point of moist air is transferred from the supply of dry gas to a space between the pipe and the vapor barrier of the fluid transfer assembly throughout at least a segment of the tube within the fluid transfer assembly, and the check valve allows the gas in the space between the pipe and the vapor barrier to escape the space, thereby removing moisture from the space.

18. The cooling system of claim 17, wherein:
the tube extends through the vapor barrier and into the space between the vapor barrier and the pipe; and
the tube includes a plurality of micro-porous openings for transferring the gas with the dew point lower than the dew point of the moist air from the supply of dry gas into the space between the vapor barrier and the pipe.

19. The cooling system of claim 18, wherein:
the tube includes a plurality of conduits connected to an outside surface of the vapor barrier at the plurality of points; and
the gas with the dew point lower than the dew point of the moist air is transferred from the supply of dry gas to the fluid transfer assembly through the tube and the conduits.

20. The cooling system of claim 17, wherein:
the segment of the tube includes a plurality of micro-porous openings for transferring the gas from the supply of dry gas into the fluid transfer assembly.

21. The cooling system of claim 20, wherein:
the segment of the tube transfers gas into the fluid transfer assembly at a substantially equal rate along the segment of the tube.

22. The cooling system of claim 17, wherein:
the supply of dry gas comprises an air dryer for removing moisture in air to provide dry air; and
the dry gas is the dry air provided by the air dryer.

23. A fluid transport system comprising:
a fluid transfer assembly including a pipe for transporting a cold fluid and a vapor barrier surrounding the pipe;
a supply of dry gas; and
a tube connected to the supply of dry gas and the fluid transfer assembly, and located at least partially within the fluid transfer assembly;
wherein the tube transfers dry gas from the supply of dry gas to the fluid transfer assembly throughout at least a segment of the tube within the fluid transfer assembly; and
wherein the vapor barrier includes at least one escape opening for allowing gas to escape from the vapor barrier.

24. The fluid transport system of claim 23, wherein:
the segment of the tube is located between the vapor barrier and the pipe; and
the tube includes a plurality of micro-porous openings for transferring the dry gas from the supply of dry gas into an area between the vapor barrier and the pipe.

25. The fluid transport system of claim 24, wherein:
at least a portion of the vapor barrier is spaced from the pipe; and
insulation is located between the portion of the vapor barrier and the pipe.

26. The fluid transport system of claim 23, further including:
at least one check valve, each check valve being inserted into the escape opening in the vapor barrier of the fluid transfer assembly for allowing gas to escape from the vapor barrier through the escape opening.

27. The fluid transport system of claim 23, wherein:
the segment of the tube includes a plurality of micro-porous openings for transferring the gas from the supply of dry gas into the fluid transfer assembly.

28. The fluid transport system of claim 27, wherein:
the segment of the tube transfers gas into the fluid transfer assembly at a substantially equal rate along the segment of the tube.

29. The fluid transport system of claim 23, wherein:
the supply of dry gas comprises an air dryer for removing moisture in air to provide dry air; and
the dry gas is the dry air provided by the air dryer.

30. A method of insulating a fluid transfer assembly having a pipe for transporting a cold fluid and a vapor barrier surrounding the pipe, the method comprising:
supplying dry gas; and
connecting a tube to the supply of dry gas and the fluid transfer assembly;
injecting gas from the supply of dry gas into the fluid transfer assembly throughout at least a segment of the tube within the fluid transfer assembly; and
removing gas from the fluid transfer assembly through at least one escape opening in the vapor barrier, whereby the gas in the fluid transfer assembly can maintain a low dew point.

31. The method of insulating a fluid transfer assembly of claim 30, further including:
locating the segment of the tube between the vapor barrier and the pipe of the fluid transfer assembly;
providing the segment of the tube with a plurality of micro-porous openings;
wherein injecting gas includes injecting gas through the plurality of micro-porous openings.

32. The method of insulating a fluid transfer assembly of claim 30, further including:
spacing the vapor barrier from the pipe;
placing insulation between the vapor barrier and the pipe.

33. The method of insulating a fluid transfer assembly of claim 30, further including:
providing the tube with a plurality of conduits comprising the segment of the tube; and
connecting the plurality of conduits to an outside surface of the vapor barrier;

wherein injecting gas includes injecting gas from the supply of dry gas and into the fluid transfer assembly through the conduits.

34. The method of insulating a fluid transfer assembly of claim 33, further including:

spacing at least a portion of the vapor barrier from the pipe; and placing insulation between the portion of the vapor barrier and the pipe.

35. The method of insulating a fluid transfer assembly of claim 30, further including:

connecting at least one check valve to the vapor barrier of the fluid transfer assembly, each check valve being located at the at least one escape opening;

wherein removing gas from the fluid transfer assembly through the escape opening includes removing gas from the fluid transfer assembly through the at least one check valve at the at least one escape opening.

36. The method of insulating a fluid transfer assembly of claim 35, wherein:

connecting at least one check valve to the vapor barrier includes connecting a plurality of check valves to the vapor barrier.

37. The method of insulating a fluid transfer assembly of claim 30, wherein:

injecting gas includes injecting gas through the plurality of micro-porous openings at a substantially equal rate along the segment of the tube.

38. The method of insulating a fluid transfer assembly of claim 30, wherein:

supplying dry gas includes removing moisture from air with an air dryer.

* * * * *